(12) United States Patent
Klein et al.

(10) Patent No.: US 6,275,955 B1
(45) Date of Patent: Aug. 14, 2001

(54) DIAGNOSTIC SOFTWARE FOR FACILITATING FLOWCHART PROGRAMMING

(75) Inventors: Michael T. Klein; Don C. Stokes, both of Ann Arbor, MI (US)

(73) Assignee: Steeplechase Software, Inc., Ann Arbor, MI (US)

( * ) Notice: Subject to any disclaimer, the term of this patent is extended or adjusted under 35 U.S.C. 154(b) by 0 days.

(21) Appl. No.: 09/079,093

(22) Filed: May 14, 1998

Related U.S. Application Data

(60) Provisional application No. 60/046,704, filed on May 14, 1997.

(51) Int. Cl.$^7$ .............................. H02H 3/05; H04B 1/74
(52) U.S. Cl. .................................... 714/38; 714/2
(58) Field of Search ................... 714/38, 2, 15, 714/20, 48; 712/227; 395/701, 704, 712, 710

(56) References Cited

U.S. PATENT DOCUMENTS

| | | | | |
|---|---|---|---|---|
| 4,852,047 | * | 7/1989 | Lavallee et al. ..................... | 364/191 |
| 5,355,482 | * | 10/1994 | Ohhashi et al. ..................... | 364/147 |
| 5,485,620 | * | 1/1996 | Sadre et al. ........................ | 395/710 |
| 5,581,759 | * | 12/1996 | Ohhashi et al. ..................... | 364/147 |
| 5,613,115 | * | 3/1997 | Gihl et al. .......................... | 395/701 |
| 5,673,386 | * | 9/1997 | Batra .................................. | 714/38 |
| 5,742,754 | * | 4/1998 | Tse ..................................... | 714/38 |
| 5,948,112 | * | 9/1999 | Shimada et al. .................... | 714/16 |

* cited by examiner

*Primary Examiner*—Dieu-Minh T. Le
(74) *Attorney, Agent, or Firm*—Rader, Fishman & Grauer PLLC

(57) ABSTRACT

A digital computer implemented software system is provided that translates a graphical flow chart into a control program and displays the same upon a visual display attached to the digital computer during execution of a control program. The graphic flow chart includes a diagnostic decision block for automatically generating a diagnostic program based on user-entered error condition parameters. The diagnostic decision block replaces manual programming of each parameter and each block in the diagnostic program, reducing maintenance time when the parameters need to be updated. Specific problem solving steps can also be programmed as parameters to aid a machine operator in locating and fixing errors in the manufacturing process.

18 Claims, 7 Drawing Sheets

DIAGNOSTIC SOFTWARE FOR FACILITATING FLOWCHART PROGRAMMING

This application claims benefit of Provisional Appln 60/046,704 filed May 14, 1997.

FIELD OF THE INVENTION

The present invention relates generally to the diagnosis of problems in industrial equipment and processes. More particularly, the invention relates to the programming of graphical flow charts that are used for detecting and diagnosing error conditions in an industrial machine or process.

BACKGROUND OF THE INVENTION

Manufacturers seek to take advantage of the greater flexibility of general purpose computers, including inexpensive commercially available personal computers, or "PCs", to enhance the efficiency associated with creating and maintaining software programs used to control industrial processes. Because general purpose computers can be programmed in high level commercially available languages such as BASIC, FORTRAN, C, or in object-oriented languages such as C++, manufacturers and process control vendors have been able to develop PC-based control systems that emulate traditional "PLC" (programmable logic controller) functions, but do it in such a way that permits them to be easy to use, program and maintain, while still offering significant cost savings over dedicated PLC-based solutions.

In many instances when a PLC is used, the PLC is connected to a central control computer. In such an arrangement, the PLC plays its own dedicated role controlling the industrial process at hand while concurrently communicating information back to the central computer. By using the high level commercially available programming languages, control methods have evolved using graphical flow charts to aid the software programmer developing control programs which can emulate traditional PLC functions. Use of PCs in this way enables a manufacturer to develop and run the operator interface on the same PC and share data with other WINDOWS based programs through a dynamic data exchange. Thus, a single PC may perform the function of the programmable logic controller, the operator panel, the programming terminal, and the real time system simulator. A PC therefore can replace three separate components: PLC programming terminal, PLC processor, and operator interface. By implementing a PC-based control system, manufacturers are able to lower control system investment costs, increase productivity in design and industrial operations, and reduce down time with pre-programmed flow chart based diagnostics.

The vast majority of industrial processes, by definition, consist of a series of sequential or concurrent steps, each step involving one or more actions to be taken by a machine or machines. The steps may occur at specific times and in a specified sequence according to specific parameters, or may occur in response to specific events. Each step may have one or more elements, each element describing activities or operations with greater specificity. The large number and types of errors that occur at each step of a manufacturing process, however, can make creating a diagnostic program using only flowchart steps inefficient and burdensome. As shown in FIG. 3, each step in the manufacturing process normally has more than one possible error condition. Ordinarily, a separate flowchart decision must be created for each error condition. Within each decision, the programmer must specify each parameter for detecting and evaluating the error condition in each decision, and if the parameters for any error condition change, the programmer must manually search for and update the parameters inside the flowchart program. As a result, updates of the diagnostic parameters require a large amount of development time in the programming of the manufacturing process.

Manufacturers and applications engineers are therefore very interested in new methods for increasing the efficiency associated with developing control programs, and especially methods for increasing the efficiency of programming flowchart based diagnostics.

SUMMARY OF THE INVENTION

Accordingly, the present invention is directed to creating diagnostic software that reduces the amount of time and number of steps needed to program diagnostic functions into a software logic controller. More particularly, the invention is directed to a diagnostic decision tool that allows a programmer to enter diagnostic parameters through a simple user interface and automatically generates a diagnostic program based on the entered parameters. If any parameter in the diagnostic program needs to be changed, the programmer can enter the parameter change through the user interface rather than examining the program and changing each parameter manually; the diagnostic decision tool automatically changes the parameter everywhere it appears in the diagnostic program. Further, the programmer can enter information that is to be displayed upon a specific error condition, thereby notifying an operator of the specific nature of the error condition as well as providing instructions on how to fix the error condition. Thus, the invention reduces the amount of time needed to program and update diagnostic functions and also provides more detailed information for assisting machine operators in fixing error conditions, reducing overall manufacturing down time.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
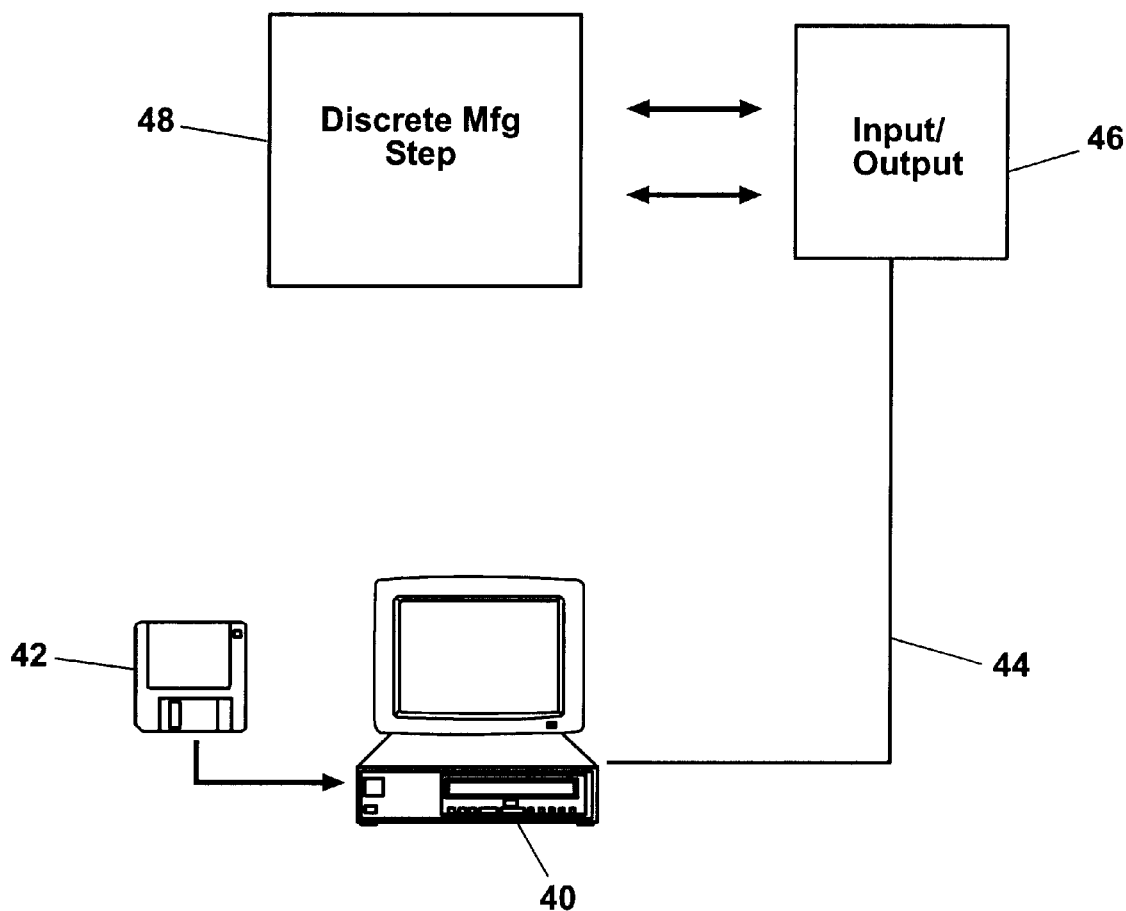
FIG. 1 is a diagrammatic block view of the hardware of the present invention.

Now referring to FIG. 1, the control program hardware apparatus includes a digital computer 40 and controlling program software embodied on a storage device 42, such as a floppy disk or CD-ROM. In a typical hardware arrangement, computer 40 is connected 44 to input/output device 46. Input/output device 46 is controlled via the control program software 42 and interacts with a discrete industrial step 48 which is a subpart of a industrial process. Each discrete industrial step 48 occurs at a predetermined time, or in response to a predetermined parameter, which is either supplied by or measured by input/output device 46, or both. Input/output device 46 thus provides the external stimuli to digital computer 40, in response to which the control program may cause other industrial events to occur.

Using known methods and commercially available control program software packages, an applications engineer may construct a control program for an industrial application. Some commercially available software packages allow for a control program to be constructed only in graphical flow chart form. However, any control program is capable of being described through the use of a flow chart, such as chart 10 shown in FIG. 2. In a simple demonstrative program depicted by flow chart 10 in FIG. 2, a continuous loop program initiates from the terminal point labeled start. Several decision points 12, 14, 16 and 18 are serially arranged within the program. Each decision point 12, 14, 16 and 18 determines which of the many possible alternative paths to follow. According to chart 10, a "no" answer at a decision operator results in the process passing to the next decision operator. Alternatively, a "yes" response to a decision operation results in a path to a processing function 22, 24, 26 or 28. Upon completion of a processing function 22, 24, 26 or 28, the program described in chart 10 returns to the first decision operator 12 and executes once more.

Figure 2:
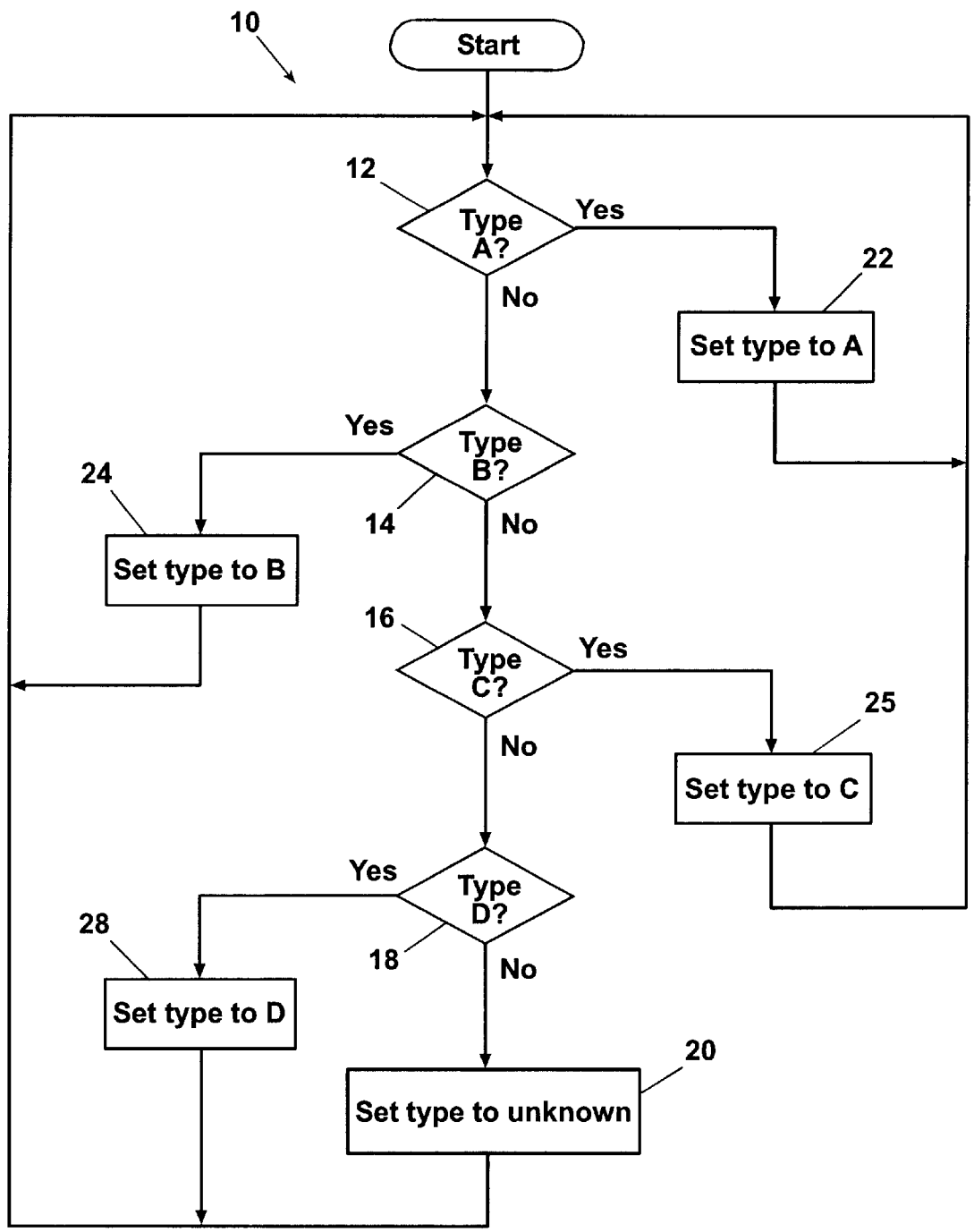
FIG. 2 is an example of a flow chart in a typical control application as depicted through known graphical flow chart technology.

When a control program such as embodied in chart 10 of FIG. 2 is created, and before the program is made operational within an industrial process, the program must be tested and/or debugged to ensure intended operation. Debugging operations typically involve a step approach, wherein each step of the operation is checked against expected values, and upon verification of the correct values, the program is allowed to continue with additional step or steps. In the step approach, the system used for debugging often limits the user to a display of the functional status of each of the inputs or outputs affected by the program that are designated by the user. Thus for example, the program used to carry out the logic steps depicted in flow chart 10 of FIG. 2 would be tested or debugged by allowing execution to continue past one of the processing functions 22, 24, 26 or 28, at which time a value or set of values would be checked against an expected result. Alternatively or concurrently, as applied to FIG. 2, conventional debugging would require that a break point be inserted after one or more of decision operations 12, 14, 16 or 18. When the program reaches a stop point inserted by the developer, the developer may then check the value of variables.

By using the present invention, however, debugging and evaluation of a control program may be simply and easily performed utilizing graphical representations of a simple flow chart diagram. Since every control program may be represented with a flow chart, this software invention finds wide application. In a preferred embodiment, a programmer uses a commercially available graphical flow chart software package to program a digital computer to control an industrial step.

One industrial application using a graphical flow chart is a diagnostic decision tool for allowing detection and evaluation of problems in a manufacturing process. Normally, if an error, such as a mechanical failure, occurs on a production line, it is usually due to a simple, easily fixed mechanical problem rather than a more complex electrical problem. Conventionally, machine controllers only identify the existence of the error, not the nature of the error itself. As a result, the machine operator usually must call in a specialist, such as an electrician, to search for the source of the problem. Once the problem is located, it is usually a simple matter to fix it; more time is normally spent locating the problem than fixing it. The invention provides an immediate pinpoint of the source of an error, allowing it to be quickly identified and remedied to minimize down time of the manufacturing process.

Figure 3:
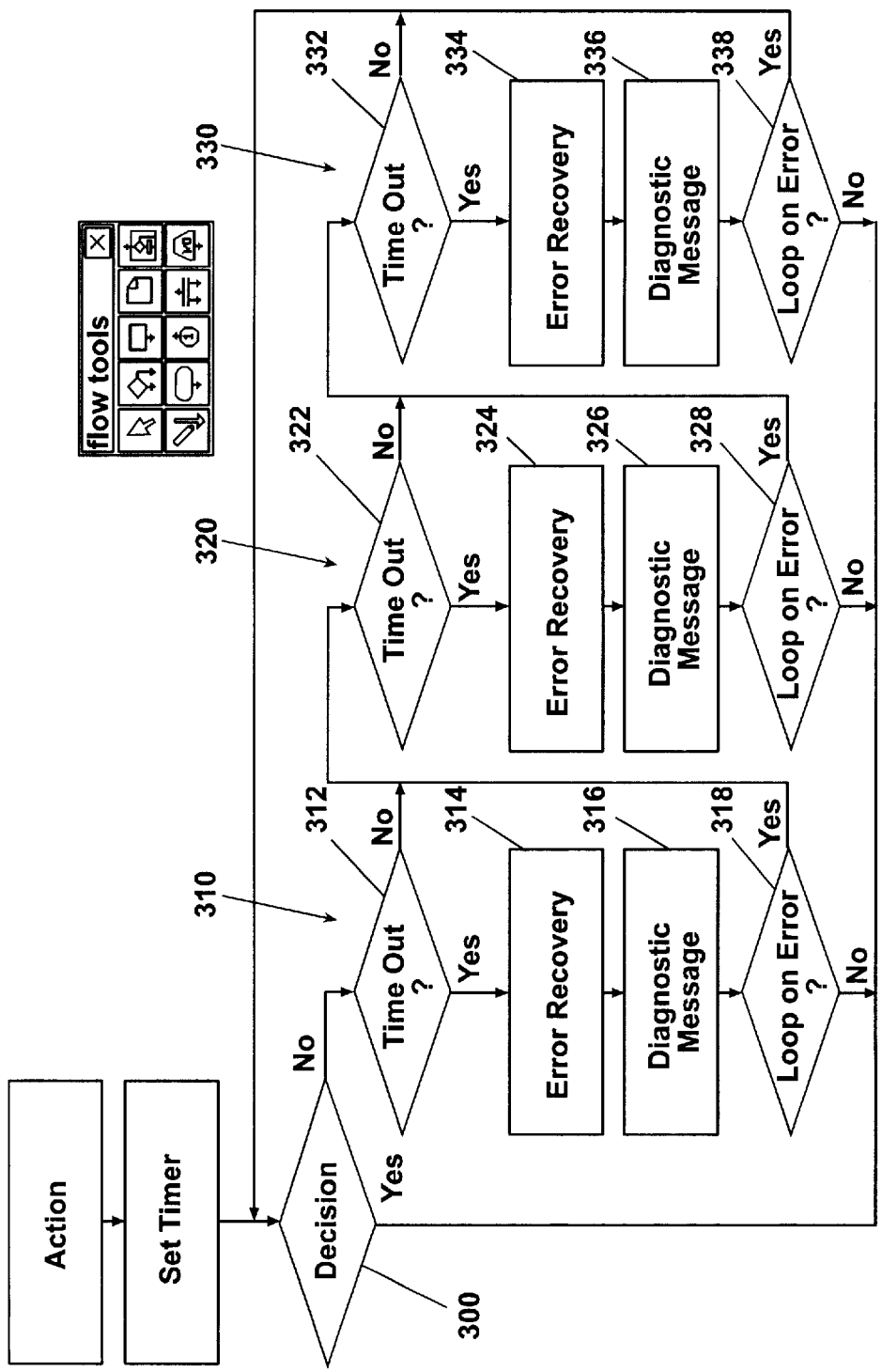
FIG. 3 is an example of a diagnostic function manually programmed using graphical flowchart technology.

In conventional flowchart programming, diagnostic logic is programmed manually. FIG. 3 illustrates a conventional program where one decision box is added for each possible fault that could occur at any given step of the process. This programming can become very tedious because each of the extra decision boxes must be added at each manufacturing step by manually programming every block in the diagnostic program. The example in FIG. 3 illustrates a diagnostic decision program having three branches 310, 320 and 330. For purposes of explanation only, branch 310 corresponds to a time out condition and branch 320 corresponds to a logic fault condition, but other error conditions can also be defined without changing the basic nature of the program. Normally, a programmer must manually program each block and the parameters associated with each block in the diagnostic decision flowchart individually when creating the diagnostic program.

The present invention creates a system that automatically generates diagnostic logic using decisions, actions, faults and messages without requiring the programmer to program every block and parameter manually to generate the diagnostic program.

Figure 4:
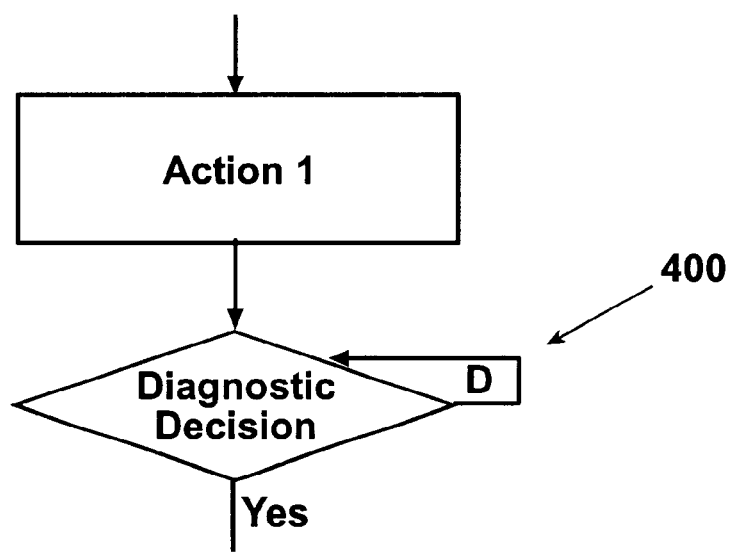
FIG. 4 illustrates the diagnostic decision tool of the present invention.

Instead of including a separate flowchart program for each decision, the invention encapsulates all of the fault handling into one diagnostic decision block 400, as shown in FIG. 4. The loop marked D in the diagnostic decision block 400 corresponds to all of the NO branches (or YES branches with loop on errors) in FIG. 3 Thus, the diagnostic decision block does not carry out a diagnostic action unless an error condition occurs in the manufacturing process. If the process is progressing normally, the flowchart will proceed through the YES branch in the block 400 without executing any of the diagnostic functions. When a programmer wishes to create a diagnostic program, he only needs to place the diagnostic decision block 400 into the program and fill in important parameters through a simple user interface, which will be explained below. The invention then automatically generates the diagnostic program of FIG. 3, without any additional programmer intervention, incorporating the parameters.

Figure 5B:
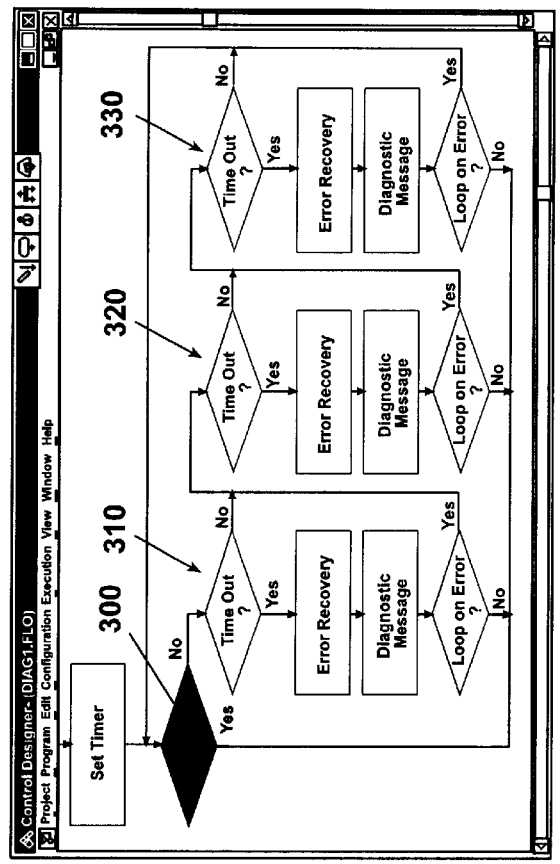
FIGS. 5a through 7b are examples of possible user interfaces for inputting diagnostic parameters to used by the diagnostic decision tool in generating a diagnostic program.
Figure 5A:
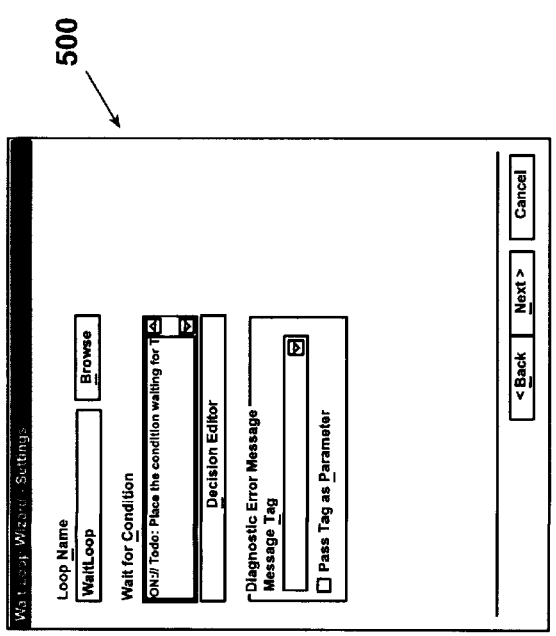

FIGS. 5*a* through 7*b* illustrate how parameters are entered through the user interface of the invention. FIG. 5*a* shows the user interface after the programmer has placed the diagnostic decision block 400 at a selected location in the program. The user interface first includes a settings screen 500 prompting the programmer to enter a name for the decision block, the decision criteria for determining whether an error requiring diagnosis has occurred, and an error message to be generated notifying the machine operator of the error. The settings screen can also prompt for additional information such as a URL address, a timer tag, or a reset loop. One possible settings screen corresponding with decision block 300 is shown in FIG. 5*b,* but other settings screens containing other information can also be used.

Figure 6B:
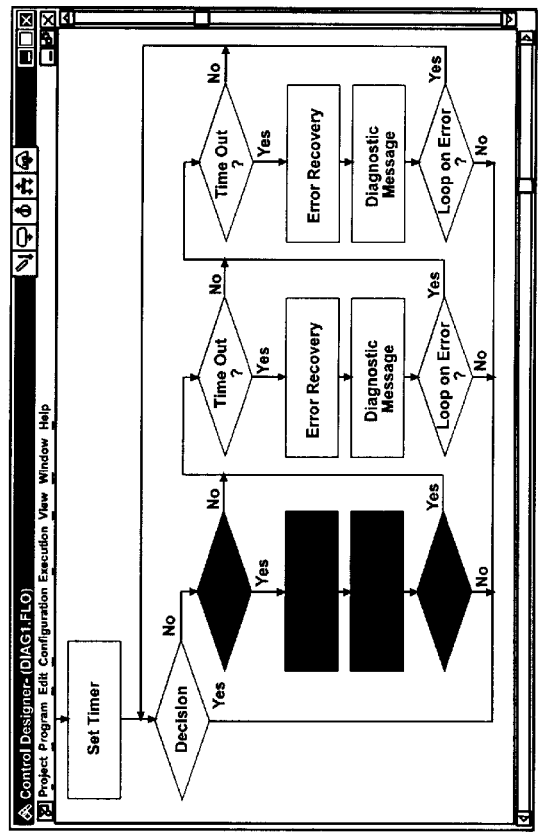
Figure 6A:
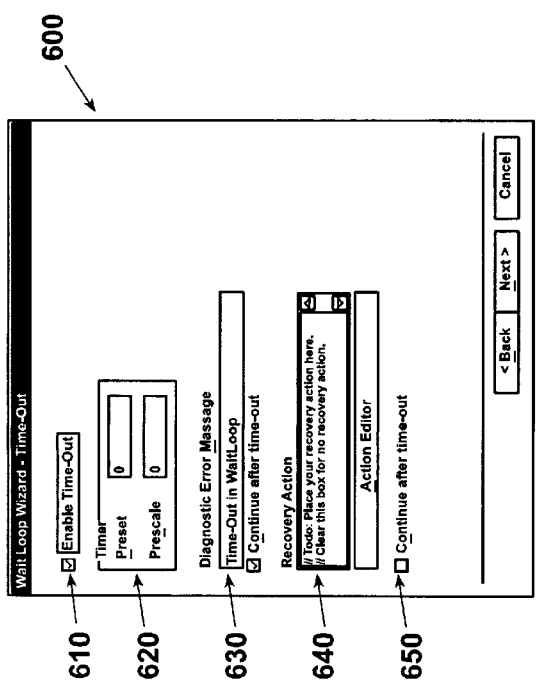

Once the diagnostic decision block 400 is labeled, the programmer can start entering parameters for various faults associated with the decision. For example, a basic time out fault is illustrated in FIGS. 6*a* and 6*b.* In a time out, if the operator knows that it should not take more than three seconds to complete a task, and if three seconds pass without the task being completed, a diagnostic action takes place to locate the source of the error. Rather than manually programming each block in the time-out diagnostic program, a time-out user interface 600, as shown in FIG. 6a, simplifies the process. In this example, the user can select whether to enable a time out 610, select the amount of time to wait 620, select the error message 630 to be generated by the invention if a time-out error is detected, define steps for recovering from the error 640 if desired, and select whether to continue executing the program after time out 650. The error message 630 can be as detailed as the programmer wishes and could include, for example, a URL address directing the manufacturing operator to additional documentation regarding the specific problem that has occurred. By including extra error information, the invention allows the machine operator to repair the problem on the spot, getting the machine back into operating mode much more quickly than the normal procedure of calling in a specialist. Further, the automatic diagnostic action allows actual implementation of diagnostics, allowing the programmer to include more information in the diagnostic error message and possibly initiating an interactive mode in the error recovery state, in which the machine asks the user a series of questions to identify the problem further. The programmer could also direct the controller to take certain actions automatically to recover from the error condition. Again, once the parameters are entered for a specific diagnostic decision block, all areas of the controller using the same diagnostic decision block will incorporate the same parameters without requiring the programmer to enter them manually.

Figure 7B:
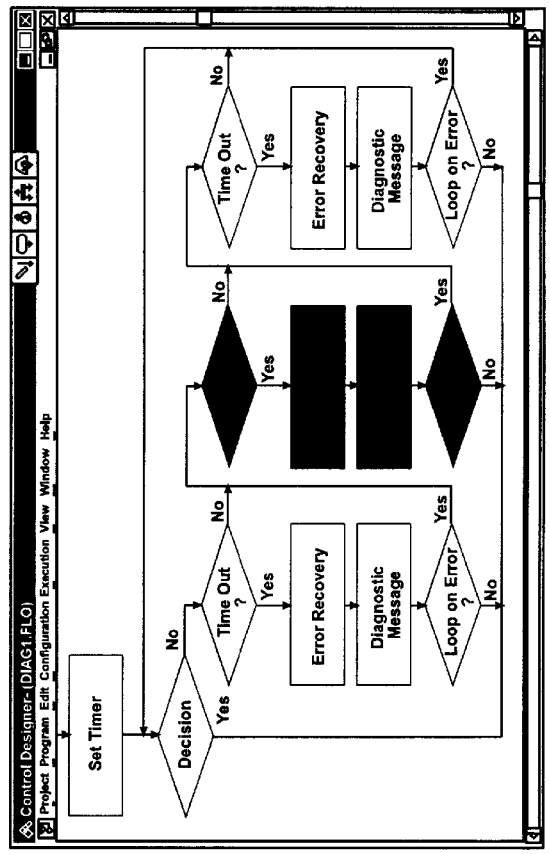
Figure 7A:
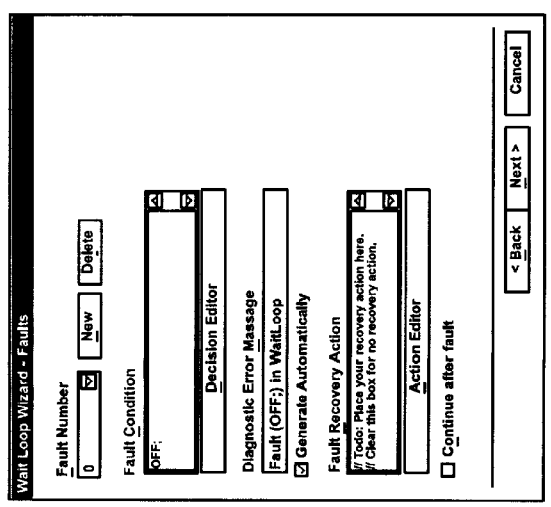

As shown in FIG. 6b, the parameters in this example correspond to branch 310 in the conventional diagnostic decision program, but the programmer does not have to program all of the blocks in the branch 310 individually. Instead, the invention will automatically generate the program branch 310 and automatically incorporate the parameters entered in the user interface 600. If the programmer wishes to change any parameter, he only needs to enter the change once in the user interface 600 and all of the time-outs in the diagnostic decision block 400 will be updated, even if the same specific diagnostic decision block 400 is used more than once in the overall control program. FIGS. 7a and 7b illustrate a similar process as FIGS. 6a and 6b for entering parameters relating to a logic fault condition. Because the concepts and advantages illustrated in FIGS. 7a and 7b are similar to those in FIGS. 6a and 6b, the description will not be repeated here.

Thus, the invention encapsulates all of the diagnostic decisions in one area, making it much easier to change operating logic and keep diagnostics up to date. Although the invention does not take away the burden of trying to decide each condition that could require a diagnostic message, it does remove the burden of constantly keeping them up to date by incorporating all of the diagnostics into one area. Thus, changing particular parameters, such as the time required before a time out occurs, regenerates the diagnostics automatically. In this case, the programmer does not have to enter each diagnostic stream in the flowchart program to change the parameters therein. The present invention also removes the burden of generating a diagnostic program at each point within a control program where errors might occur. Instead, the present invention automatically generates such a diagnostic program based upon entered parameters without any additional programmer input. By using the present invention, the programmer may achieve faster software implementation and less manufacturing down time than that currently afforded by existing PLC technology or existing graphical user interface programming tools.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A computer implemented software system for programming and implementing an error diagnostic and recovery system in a software logic controller using a graphical flow chart language, the system comprising:
    a first interface for parameters defining normal operation of at least a portion of a manufacturing step;
    a second interface for parameters defining at least one error condition;
    a third interface for parameters defining instructions for fixing said at least one error condition; and
    a program generator that automatically generates a diagnostic and recovery program in the graphical flow chart language incorporating the parameters entered through the first, second and third interfaces.

2. The system of claim 1, wherein the program includes means for detecting the error condition and an error recovery program that is executed when the error condition is detected.

3. The system of claim 1, wherein the interface includes:
    at least one diagnostic decision property screen containing a plurality of fields for receiving the parameters defining the error condition.

4. The system of claim 3, wherein each diagnostic decision property screen in the interface includes:
    means for defining a condition at which the diagnostic program will execute;
    means for defining a time-out error condition; and
    means for defining one or more fault conditions associated with one condition at which the diagnostic program will execute.

5. The system of claim 1, wherein the diagnostic and recovery program generated by the program generator includes a diagnostic message generator for automatically generating a diagnostic message on a display notifying a user of the error condition and instructions for correcting the error condition.

6. The system of claim 5, wherein the diagnostic and error recovery program automatically displays a URL address directing a user to documentation about the error condition to aid the user in correcting the error condition.

7. A method for generating an error diagnostic and recovery program in a software logic controller using a graphical flow chart language, comprising:
    selecting parameters defining at least one error condition, the parameters including an error message to be displayed automatically upon detection of the error condition and a diagnostic message to assist in error recovery;
    selecting parameters defining normal operation of at least a portion of a manufacturing step;
    selecting parameters defining instructions for fixing said at least one error condition; and
    automatically generating a diagnostic and recovery program based on the parameters in the graphical flow chart language without additional manual programming in the graphical flow chart language by the user.

8. The method of claim 7, wherein the diagnostic message from the selecting parameters defining at least one error condition step includes a URL address directing a user to documentation about the error condition to aid the user in correcting the error condition.

9. The method of claim 8, wherein the diagnostic message from the selecting parameters defining at least one error condition step includes a text message to aid the user in correcting the error condition.

10. The method of claim 7, wherein the diagnostic message from the selecting parameters defining at least one error condition step includes a text message to aid the user in correcting the error condition.

11. A computer implemented software system for programming and implementing an error diagnostic and recovery system in a software logic controller using a graphical flow chart language, the system comprising the steps of:

selecting parameters defining at least one error condition, the parameters including an error message to be displayed automatically upon detection of the error condition and a diagnostic message to assist in error recovery;

selecting parameters defining normal operation of at least a portion of a manufacturing step;

selecting parameters defining instructions for fixing said at least one error condition; and automatically generating a diagnostic and recovery program based on the parameters in the graphical flow chart language without additional manual programming in the graphical flow chart language by the user.

12. The software system of claim 11, wherein the diagnostic message from the selecting parameters defining at least one error condition step includes a URL address directing a user to documentation about the error condition to aid the user in correcting the error condition.

13. The method of claim 12, wherein the diagnostic message from the selecting parameters defining at least one error condition step includes a text message to aid the user in correcting the error condition.

14. The method of claim 11, wherein the diagnostic message from the selecting parameters defining at least one error condition step includes a text message to aid the user in correcting the error condition.

15. A computer readable storage device used to control a flowchart programmed software logic controller, comprising the steps of:

selecting parameters defining at least one error condition, the parameters including an automatically generated error message to be displayed automatically upon detection of the error condition and a diagnostic message to assist in error recovery;

selecting parameters defining normal operation of at least a portion of a manufacturing step;

selecting parameters defining instructions for fixing said at least one error condition; and automatically generating a diagnostic and recovery program based on the parameters in the graphical flow chart language without additional manual programming in the graphical flow chart language by the user.

16. The storage device of claim 15, wherein the diagnostic message from the selecting parameters defining at least one error condition step includes a URL address directing a user to documentation about the error condition to aid the user in correcting the error condition.

17. The storage device of claim 16, wherein the diagnostic message from the selecting parameters defining at least one error condition step includes a text message to aid the user in correcting the error condition.

18. The storage device of claim 15, wherein the diagnostic message from the selecting parameters defining at least one error condition step includes a text message to aid the user in correcting the error condition.

* * * * *